(12) United States Patent
Bolkhovitin et al.

(10) Patent No.: US 11,392,417 B2
(45) Date of Patent: Jul. 19, 2022

(54) ULTRACONVERGED SYSTEMS HAVING MULTIPLE AVAILABILITY ZONES

(71) Applicant: Quantaro, LLC, Morris Plains, NJ (US)

(72) Inventors: Vladislav Nikolayevich Bolkhovitin, San Jose, CA (US); Kirill Malkin, Morris Plains, NJ (US)

(73) Assignee: Quantaro, LLC, Morris Plains, NJ (US)

( * ) Notice: Subject to any disclaimer, the term of this patent is extended or adjusted under 35 U.S.C. 154(b) by 411 days.

(21) Appl. No.: 16/437,721

(22) Filed: Jun. 11, 2019

(65) Prior Publication Data

US 2019/0384642 A1 Dec. 19, 2019

Related U.S. Application Data

(60) Provisional application No. 62/685,223, filed on Jun. 14, 2018.

(51) Int. Cl.
*G06F 9/50* (2006.01)
*G06F 9/38* (2018.01)
(Continued)

(52) U.S. Cl.
CPC ............ *G06F 9/5061* (2013.01); *G06F 3/067* (2013.01); *G06F 3/0617* (2013.01);
(Continued)

(58) Field of Classification Search
CPC .... G06F 9/5061; G06F 9/3891; G06F 3/0617; G06F 3/0631; G06F 3/0658; G06F 3/067;
(Continued)

(56) References Cited

U.S. PATENT DOCUMENTS

| 2013/0160001 A1* | 6/2013 | Graham | G06F 9/45558 |
| | | | 718/1 |
| 2015/0254088 A1* | 9/2015 | Chou | G06F 3/061 |
| | | | 709/212 |
| 2017/0228285 A1* | 8/2017 | Merritt | G06F 11/1076 |

OTHER PUBLICATIONS

Intel 7500 Chipset Datasheet. Mar. 2010, URL: https://www.intel.es/content/dam/doc/datasheet/7500-chipset-datasheet.pdf. (Year: 2010).*
(Continued)

*Primary Examiner* — Idriss N Alrobaye
*Assistant Examiner* — Henry W Yu
(74) *Attorney, Agent, or Firm* — Perkins Coie LLP; Michael A. Glenn

(57) ABSTRACT

An ultraconverged architecture has multiple availability zones within a single server. The functionality in each of the availability zones is independently controlled, such that resetting and/or disconnecting any component in any availability zone from power and replacing said component does not affect availability of any other component in any other availability zone. A manager of availability zones controls reset functionality in each of a plurality of availability zones. The manager of availability zones generates a requested reset type in the requested availability zone. The manager of availability zones generates reset signals or requests for some or all components located in multiple availability zones. The reset signal or request is generated upon external request to the manager of availability zones that specifies the reset type, the availability zone, and optionally the list of components to be reset. The manager of availability zones discovers and enumerates the components in each availability zone.

56 Claims, 10 Drawing Sheets

(51) Int. Cl.
*G06F 3/06* (2006.01)
*G06F 11/14* (2006.01)
*G06F 13/40* (2006.01)

(52) U.S. Cl.
CPC .......... *G06F 3/0631* (2013.01); *G06F 3/0658* (2013.01); *G06F 9/3891* (2013.01); *G06F 9/5072* (2013.01); *G06F 11/1441* (2013.01); *G06F 13/4022* (2013.01); *G06F 2213/0026* (2013.01)

(58) Field of Classification Search
CPC ............... G06F 9/5072; G06F 11/1441; G06F 13/4022; G06F 2213/0026; G06F 3/0688; G06F 3/0634; G06F 3/0607
USPC ................ 710/6, 10, 36, 104; 709/226, 229
See application file for complete search history.

(56) References Cited

OTHER PUBLICATIONS

Intel Corporation, "Part 1 of 6—Intel 7500 Chipset Datasheet", URL: https://www.intel.es/content/dam/doc/datasheet/7500-chipset-datasheet.pdf, Mar. 31, 2010, pp. 1, 2, 165-174, 185-195, 205-254.
Intel Corporation, "Part 2 of 6—Intel 7500 Chipset Datasheet", URL: https://www.intel.es/content/dam/doc/datasheet/7500-chipset-datasheet.pdf, Mar. 31, 2010, pp. 1, 2, 165-174, 185-195, 205-254.
Intel Corporation, "Part 3 of 6—Intel 7500 Chipset Datasheet", URL: https://www.intel.es/content/dam/doc/datasheet/7500-chipset-datasheet.pdf, Mar. 31, 2010, pp. 1, 2, 165-174, 185-195, 205-254.
Intel Corporation, "Part 4 of 6—Intel 7500 Chipset Datasheet", URL: https://www.intel.es/content/dam/doc/datasheet/7500-chipset-datasheet.pdf, Mar. 31, 2010, pp. 1, 2, 165-174, 185-195, 205-254.
Intel Corporation, "Part 5 of 6—Intel 7500 Chipset Datasheet", URL: https://www.intel.es/content/dam/doc/datasheet/7500-chipset-datasheet.pdf, Mar. 31, 2010, pp. 1, 2, 165-174, 185-195, 205-254.
Intel Corporation, "Part 6 of 6—Intel 7500 Chipset Datasheet", URL: https://www.intel.es/content/dam/doc/datasheet/7500-chipset-datasheet.pdf, Mar. 31, 2010, pp. 1, 2, 165-174, 185-195, 205-254.

* cited by examiner

ULTRACONVERGED SYSTEMS HAVING MULTIPLE AVAILABILITY ZONES

CROSS REFERENCE TO RELATED APPLICATIONS

This application claims priority to U.S. provisional patent application Ser. No. 62/685,223, filed Jun. 14, 2018, the entirety of which is incorporated herein by this reference thereto.

FIELD

Various of the disclosed embodiments concern cloud computing and data center architecture. More particularly, embodiments concern systems with multiple availability zones.

BACKGROUND

With the advent and fast growth of cloud computing and storage services, providers are amassing significant numbers of compute nodes (or "servers") in their data centers. In this highly competitive environment the economies of scale weigh heavily at the infrastructure costs and drive architectural optimizations.

Hyperconverged systems, where each server can simultaneously act as both an application and a storage server, are quickly gaining popularity as a suitable platform for running software-defined services in both cloud and on-premise installations. See FIG. 1.

The key characteristics of the hyperconverged architecture are:
1. There is a network of uniform servers (11a, 11b, 11n); and
2. Each server:
   Runs applications (12a, 12b, 12n) that transparently use storage resources located both locally (13a, 13b, 13n), i.e. directly attached storage devices, and remotely on other similar servers in the network (10); and
   Exports local storage resources to other similar servers on the network.

This brings the advantage of uniformity of servers that drives a significant reduction of the infrastructure costs in modern data centers. For instance, because there is no distinction between storage and compute servers, applications can be arbitrarily placed on any server in the network for purposes of load balancing and/or handling of failures.

However, the hyperconverged architecture also has significant trade-offs because both storage and compute applications are sharing the same hardware:
1. The data traffic on behalf of other systems can sporadically and unpredictably impact the performance of compute components in the system, potentially compromising the Quality of Service (QoS) guarantees for the applications.
2. The storage availability depends on the node being booted up and running the storage sharing software. If the main OS crashes or is rebooting, the local storage becomes unavailable to other servers.

An important improvement of this architecture came with the recent introduction of so-called Smart Network Interface Cards, or Smart NICs. The Smart NICs are specially designed network adapters that have considerable compute capabilities on board, such as up to 16 high-performance CPU cores. The Smart NICs are capable of picking up the storage services workload from the compute system located on the main board of each hyperconverged server. This addresses the first issue discussed above by offloading the storage traffic. However, the second issue still applies. For instance, if the main OS encounters a bug and crashes, the storage becomes unavailable until the recovery (typically, a reboot) of the OS is complete, which could take several minutes. A similar problem arises during the update to the main OS that requires a reboot.

SUMMARY

Embodiments provide an ultraconverged architecture having multiple availability zones within a single server. In embodiments, functionality in each of the availability zones is locally and/or remotely independently controlled, such that resetting and/or disconnecting any component in any availability zone from power and replacing said component does not affect availability of any other component in any other availability zone.

In embodiments, a manager of availability zones controls reset functionality in each of a plurality of availability zones, locally and/or remotely. The manager of availability zones generates a requested reset type in the requested availability zone. In embodiments, the component could be a new hardware component, as well as a new hardware or software part of the existing management infrastructure of the server (iDRAC, iLO, BMC, etc.). For purposes of high availability, there may be multiple such components in the system. The primary function of the manager of availability zones is to generate reset signals or requests for some or all components located in multiple availability zones. The reset type may be cold (physical) or warm (programmatic), or function level. The reset signal or request is generated upon external request to the manager of availability zones that specifies the reset type, the availability zone, and optionally the list of components to be reset. The request can be delivered via API, fabric message, or electrical signal. The secondary function of the manager of availability zones is to discover and enumerate the components in each availability zone. The list of components can be requested by external caller.

DETAILED DESCRIPTION

Systems with Multiple Availability Zones

Embodiments introduce several changes to the hardware and software architecture of hyperconverged servers, each of which each point is an independent component of the solution.

Figure 1:
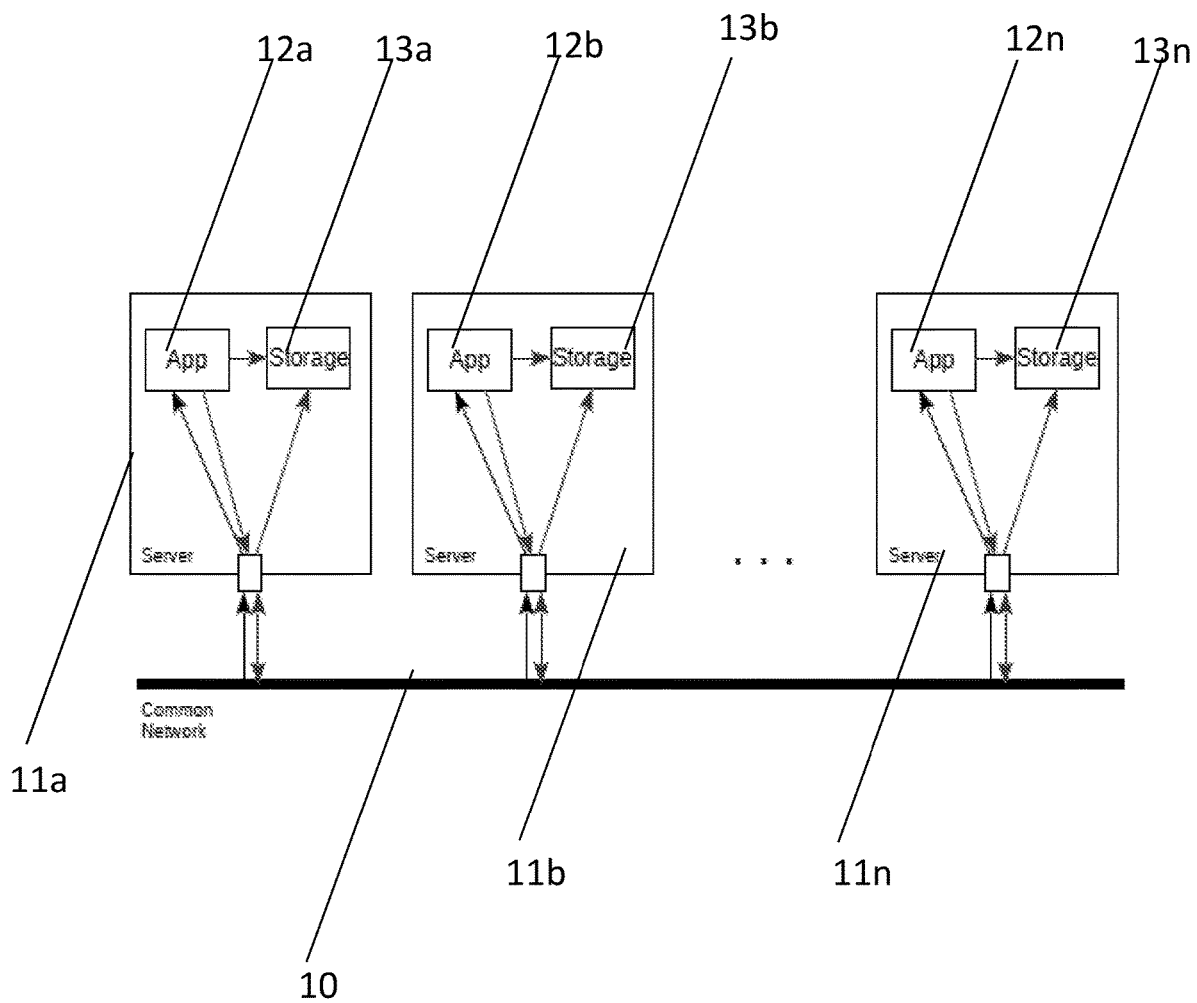
FIG. 1 is a block diagram showing a hyperconverged Infrastructure.
Figure 2:
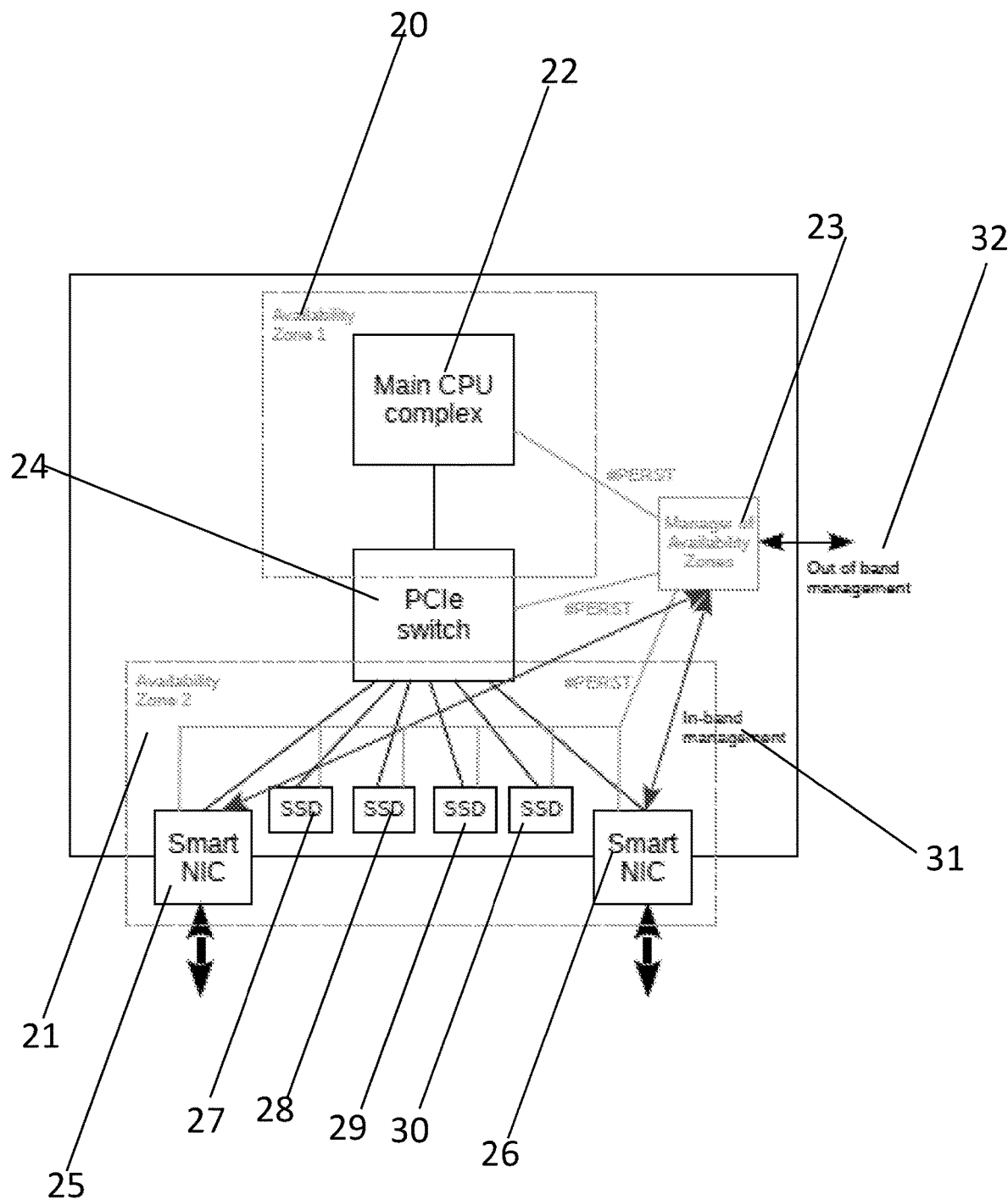
FIG. 2 is a block diagram showing an ultraconverged server with two availability zones, in-band and out of band management, and with each zone reset implemented as a separated PCIe PERST # signal.

FIG. 2 is a block diagram showing an ultraconverged server with two availability zones 20, 21, with in-band 31 and out of band 32 management. As shown in FIG. 2, each zone reset is implemented as a separate PCI Express (PCIe) PERST # signal. PCIe is based on point-to-point topology, with separate serial links connecting every device to the root complex (host). See, for example https://en.wikipedia.org/wiki/PCI_Express).

The PCIe domain of the server is split into multiple zones ("availability zones"), where the main CPU root complex 22 forms one zone, while the smart NICs 25, 26 and the attached storage devices 27, 28, 29, 30 form another zone or multiple zones. These zones are interconnected via one or more PCIe switches 24.

The PCIe switches are either physically disconnected from each zone's reset signals or configured in a way where these signals do not affect any components outside of the zone, including the switch itself ("logical disconnect"). For instance, with physical disconnect the PCIe switch is partitioned into two partitions, one PCIe partition per availability zone. Each partition has its own dedicated PERST # lane that is connected to all PCIe components in the partition and disconnected from the corresponding (PERST #) switch's pin. The PERST # lane is connected to a manager of availability zones 23 to reset the partition from the manager of availability zones. There is also a global per-switch PERST # pin connected to the manager of availability zones that is used to reset the switch from the manager of availability zones.

An alternative approach to implementing a physical reset signal disconnect is to use PCIe Non-Transparent Bridges (NTB) instead of partitions. In this case, all reset signals incoming to the switch are physically disconnected from all sources, except for the manager of availability zones.

Implementing logical disconnects is similar, but instead of physically disconnecting the reset (PERST #) pin(s), the switch is internally programmed to ignore them.

In both cases all other reset requests (warm, hot, or function Level) are handled similarly to the PERST # signal: they are not propagated across availability zones, but instead could be generated by the manager of availability zones.

There is a new component in the system, the manager of availability zones, that controls reset functionality in each zone locally and/or remotely. This component can generate the requested reset type in the requested availability zone. In embodiments, the component could be a new hardware component, as well as a new hardware or software part of the existing management infrastructure of the server (iDRAC, iLO, BMC, etc.). For purposes of high availability, there may be multiple such components in the system. The primary function of the manager of availability zones is to generate reset signals or requests for some or all components located in multiple availability zones. The reset type may be cold (physical) or warm (programmatic), or function level. The reset signal or request is generated upon external request to the manager of availability zones that specifies the reset type, the availability zone, and optionally the list of components to be reset. The request can be delivered via API, fabric message, or electrical signal. The secondary function of the manager of availability zones is to discover and enumerate the components in each availability zone. The list of components can be requested by external caller.

The manager of availability zones offers a local and/or remote programming interface that supports a requestor:

Enumerating availability zones in the server and their attributes, including available PCIe end points in each zone and their attributes (for instance, reset status); and Requesting reset of the entire zone or any specific PCIe end point or function in the zone.

On initialization, the manager of availability zones accesses an internal configuration store to discover, enumerate, or read all available availability zones, their attributes, and end points and their attributes. The manager of availability zones then initializes local and management services and enters into a ready-to-serve state in which it waits for new management requests. Upon receiving a new local or remote management request, the manager of availability zones performs requested action. This process continue until the manager of availability zones is shutdown.

Figure 3:
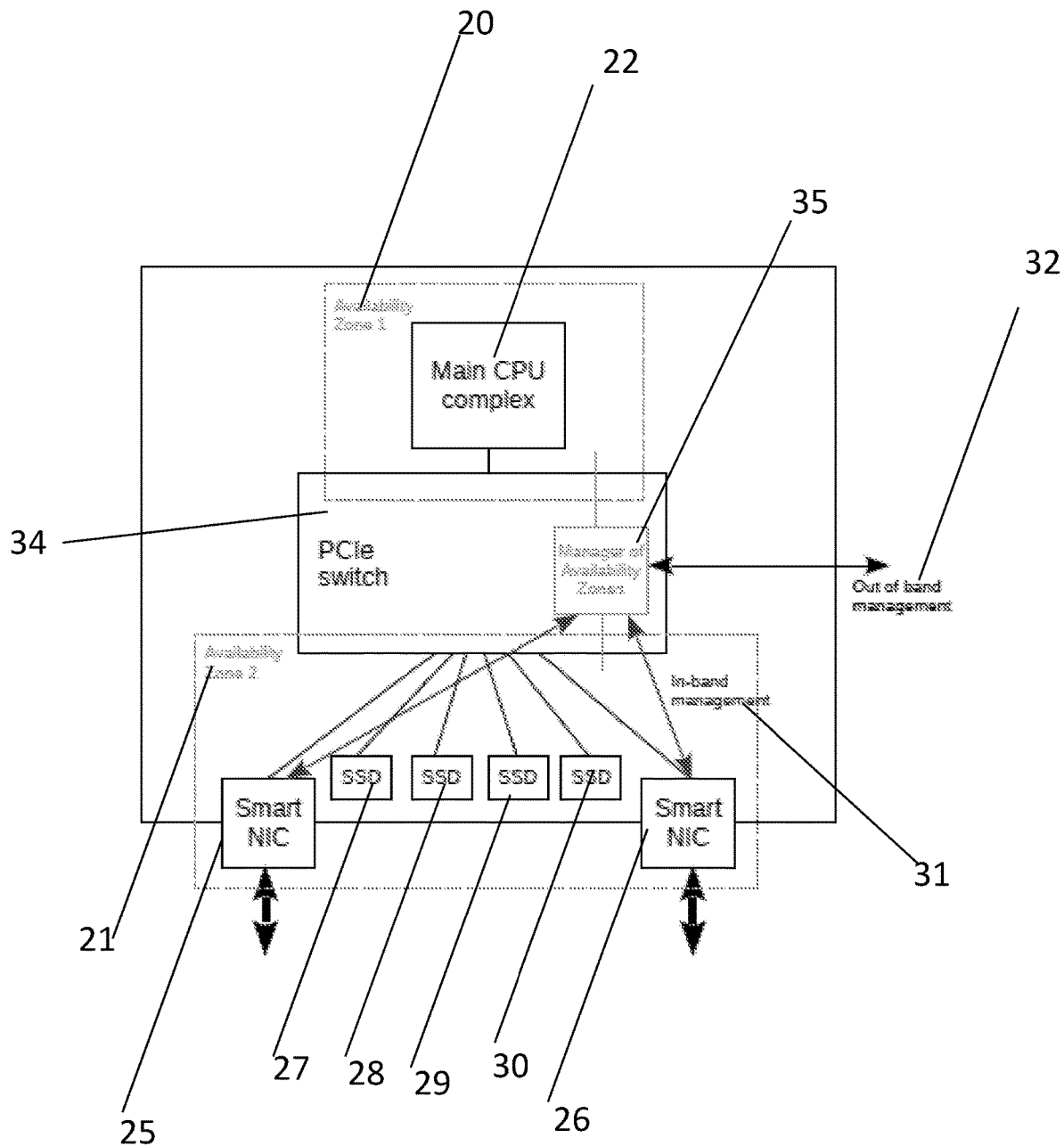
FIG. 3 is a block diagram showing an ultraconverged server with two availability zones, in-band and out of band management, and with a manager of availability zones implemented as part of the PCIe switch.

FIG. 3 is a block diagram showing an ultraconverged server with two availability zones, in-band and out of band management and a manager of availability zones 35 implemented as part of a PCIe switch 34.

In some embodiments, any component in any availability zone could be disconnected from power and replaced without affecting the availability of any other component in any other availability zone. For example, some or all components in a given availability zone can be connected to separate power supplies or power rails that are controlled individually from the board management controller (iDRAC, iLO, BMC). Alternatively, the components may have their own individual electronically controlled power switches that can be also turned on and off from the BMC or by using corresponding buttons on the server outer or inner control panel. The replacement of the component involves sending a request to the BMC to power off the component (the former case) or pressing/switching the corresponding control panel buttons (the latter case), physically replacing the component, and then sending another request to the BMC to power the component back on. Hot unplug could also be possible for components supporting it, when a component is directly disconnected or connected without prior power off or on.

This architecture is referred to herein as an "ultraconverged architecture."

Figure 4:
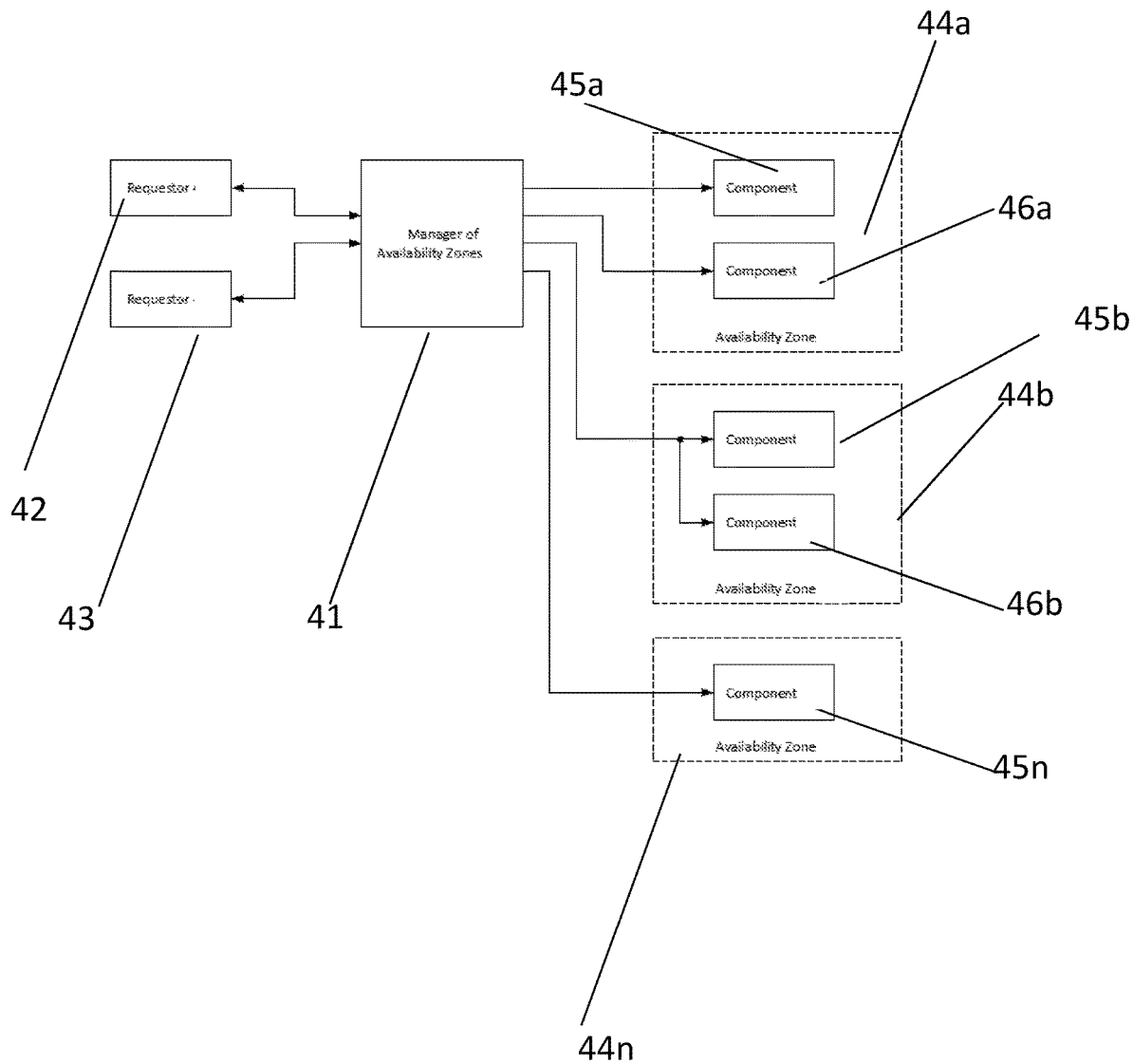
FIG. 4 is a block diagram showing a manager of availability zones.

FIG. 4 is a block diagram showing a manager of availability zones. In FIG. 4, the manager of availability zones 41 communicates with one or more requestors 42, 43 to manage respective availability zones 44a, 44b, 44n which include respective components 45a, 45b, 45n and 46a, 46b.

Figures 5A, 5B:
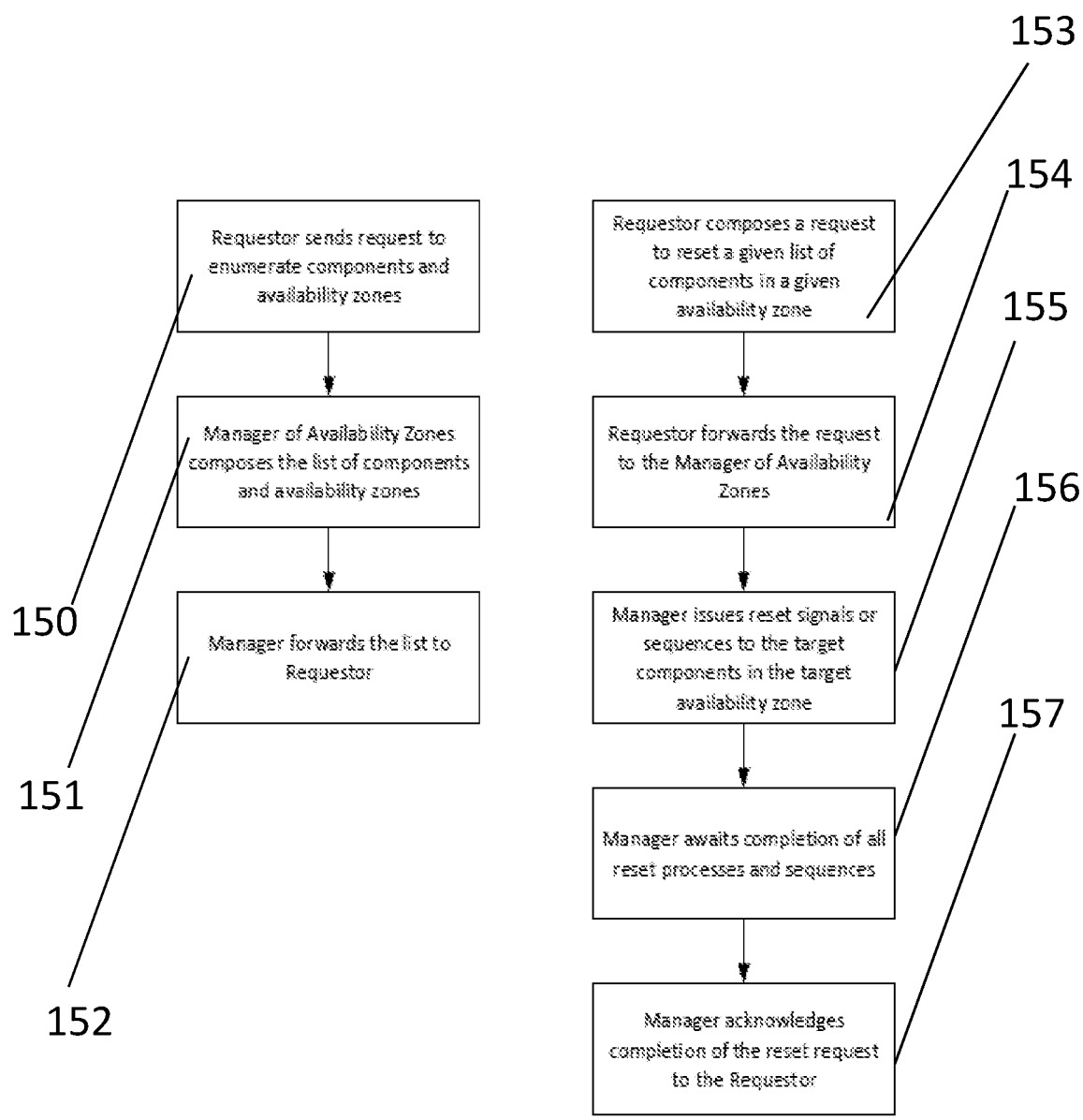
FIGS. 5A and 5B are flow diagrams showing examples of operation of the manager of availability zones.

FIGS. 5A and 5B are two flow diagrams showing examples of operation of the manager of availability zones.

In FIG. 5A, a requestor sends a request to enumerate components and availability zones (150). The manager of availability zones composes a list of the components and availability zones (151). The manager of availability zones then forwards the list to the requestor (152).

In FIG. 5B, a requestor composes a request to reset a given list of components in a given availability zone (153). The requestor forwards the request to the manager of availability zones (154). The manager of availability zones issues reset signals or sequences to the target components in the target availability zone (155). The manager of availability zones awaits completion of all reset processes and sequences (156) and then acknowledges completion of the reset request to the requestor (157).

Figure 6:
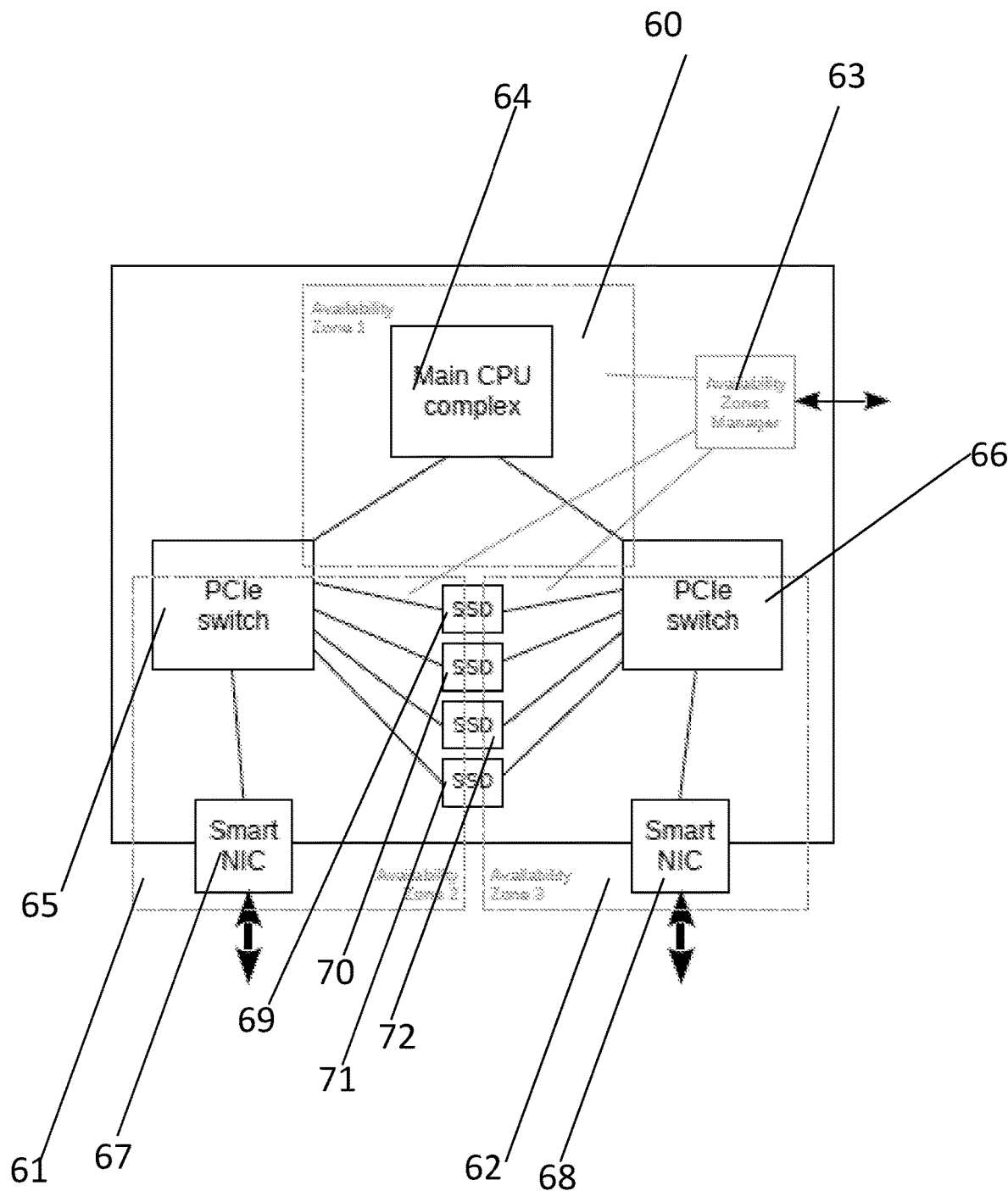
FIG. 6 is a block diagram showing an ultraconverged server with three availability zones.

FIG. 6 is a block diagram showing an ultraconverged server with three availability zones 60, 61, 62. In this example, availability zone 1 includes a main CPU complex 64; availability zone 2 includes PCIe switch 65 and smart NIC 67; availability zone 3 includes PCIe switch 66 and smart NIC 68; and storage devices 69, 70, 71, 72 are accessible via the PCIe switches of availability zones 1 and 2. The availability zones are managed by an availability zones manager 63.

Reboot Sequence

The following discussion describes a reboot sequence of the main OS with and without this innovation disclosed herein.

Here is the typical reboot sequence:
The BIOS triggers a PERST # (PCIe hardware reset) signal to perform reinitialization of end points attached to the PCIe bus;
Upon receiving this signal, all end points on the PCIe bus perform local re-initialization. In particular, all smart NICs are reset and stop providing local storage sharing services to remote servers;
The main OS boots up and restarts the storage sharing services on each of the smart NICs.

The following describes a reboot of the main OS in various embodiments, i.e., with the ultraconverged architecture:
The BIOS triggers PERST # signal to perform re-initialization of the end points attached to the PCIe bus;
Only the end points in the main system availability zone receive this signal. They perform local re-initialization. Reinitialization in this context is a set of internal component specific steps, necessary to bring this component at first to a state equivalent to that after the power-on state, then to the full functioning state.
For instance, for an SSD it would look like:
Full internal reset: all components lose their previous state and transfer to the first init state, where, for instance, all CPU cache and DRAM content is lost;
Boot internal firmware;
Start the firmware;
The firmware performs necessary initialization steps: recover journal, restore content FTL tables, etc.;
Ready.
The smart NICs and storage devices located in another availability zone do not receive this signal and continue serving local storage to remote servers without interruption;
The main OS boots up and reconnects to the local storage services provided by smart NIC;
If at some point the main OS driver detects that a smart NIC or a local storage device become unresponsive, the driver can reset this component via the new reset interface, i.e., through the manager of availability zones.

Figure 7:
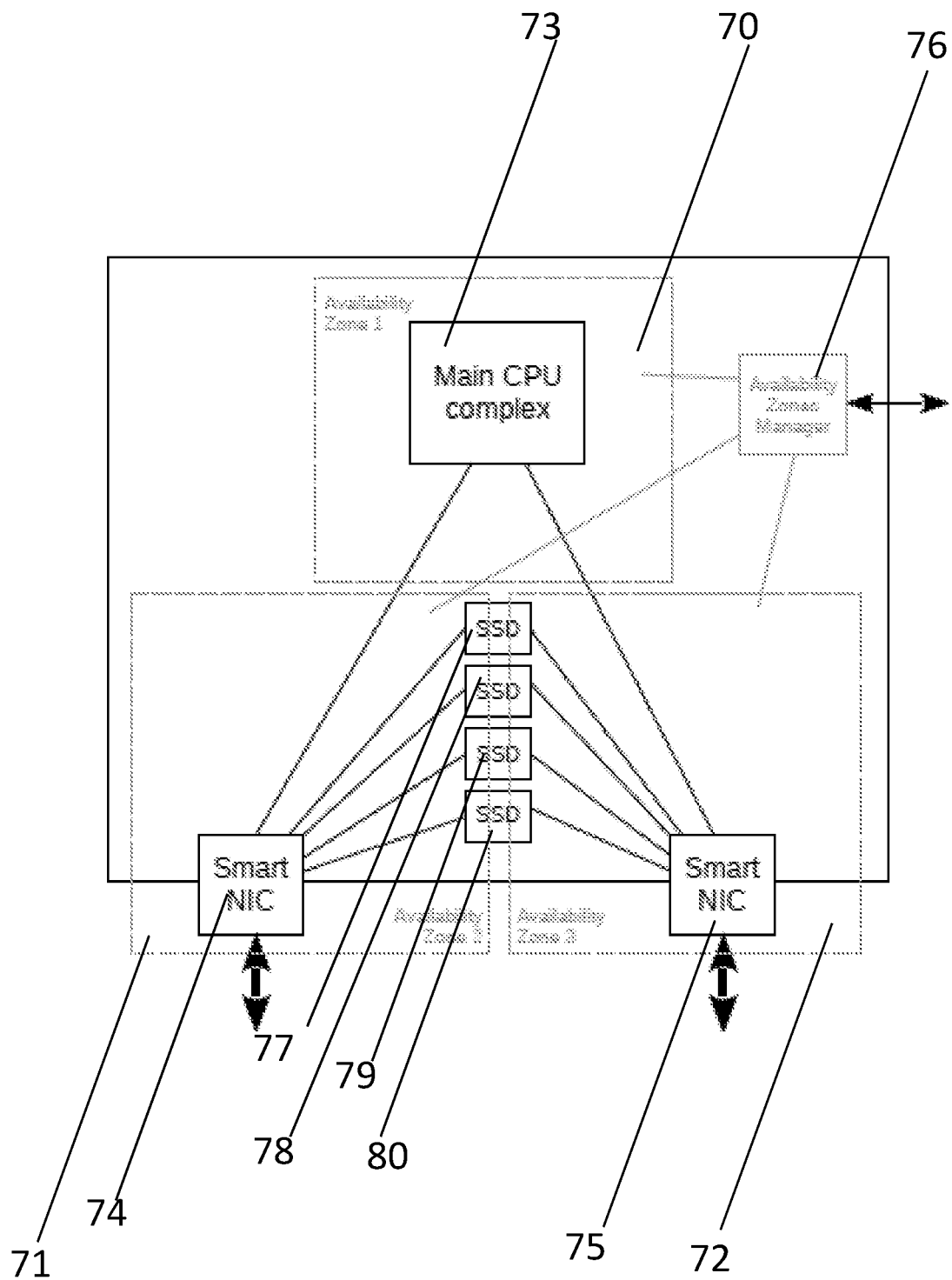
FIG. 7 is a block diagram showing an ultraconverged server with three availability zones and smart NICs.

FIG. 7 is a block diagram showing an ultraconverged server with three availability zones 70, 71, 72. Two smart NICs 74, 75 in respective availability zones 2 and 34, while the main CPU complex is in availability zone 1. Availability zones 2 and 3 each access the storage devices 77, 78, 79, 80. The availability zones are managed by the manager of availability zones 76.

The discussion above describes an internal PCIe-based fabric. Embodiments also include a generic internal server fabric. The fabric is split into multiple zones ("availability zones"), where the main CPU complex forms one zone, while the smart NICs and the attached storage devices form another zone or multiple zones. These zones are connected via one or more fabric interconnects, e.g., switches.

The fabric interconnects are either physically disconnected from each zone's reset signals or requests or configured in a way where these signals or requests do not affect any components outside of the zone, including the interconnect itself ("logical disconnect").

There is a new physical or logical component in the system, the manager of availability zones, that controls reset functionality in each zone locally and/or remotely. This component can generate the requested reset type in the requested availability zone. In embodiments, the component could be a new hardware component, as well as a new hardware or software part of the existing management infrastructure of the server (iDRAC, iLO, BMC, etc.). For purposes of high availability there may be multiple such components in the system.

The manager of availability zones offers new local and/or remote programming interface that supports:
Enumerating availability zones in the server, and their attributes, including the available fabric end points in each zone and their attributes, for instance reset status; and
Requesting reset of the entire zone or any specific fabric end point or function in the zone.

Examples of emerging internal non-PCIe fabrics include Gen-Z, CCIX, and OpenCAPI.

Embodiments include multiple fabrics within a single server, which does not change the spirit of innovation disclosed herein. For example, there may be a PCIe-based fabric for a NAND-based storage and a Gen-Zbased fabric for storage class memory (SCM), such as 3D XPoint. They could be connected via respective bridges, switches, or gateways.

Smart NICs

Smart NICs are relatively new devices that have established a presence in the hyperconverged systems market. A smart NIC implements complex server-based networking data plane functions, including multiple match-action processing, tunnel termination and origination, metering and shaping and per-flow statistics, for example; supports a fungible data plane either through updated firmware loads or customer programming, with little or no predetermined limitations on functions that can be performed; and works seamlessly with existing open source ecosystems to maximize software feature velocity and leverage.

Currently, the only known prior art is related to the adoption of smart NICs in the hyperconverged servers. However, it does not suggest separating the reset domain of the servers into multiple zones.

The prevalent method of integrating smart NICs into hyperconverged systems discussed in the art is through peer-to-peer communication between the smart NIC and storage devices that bypasses the main CPU and memory complex.

Figure 8:
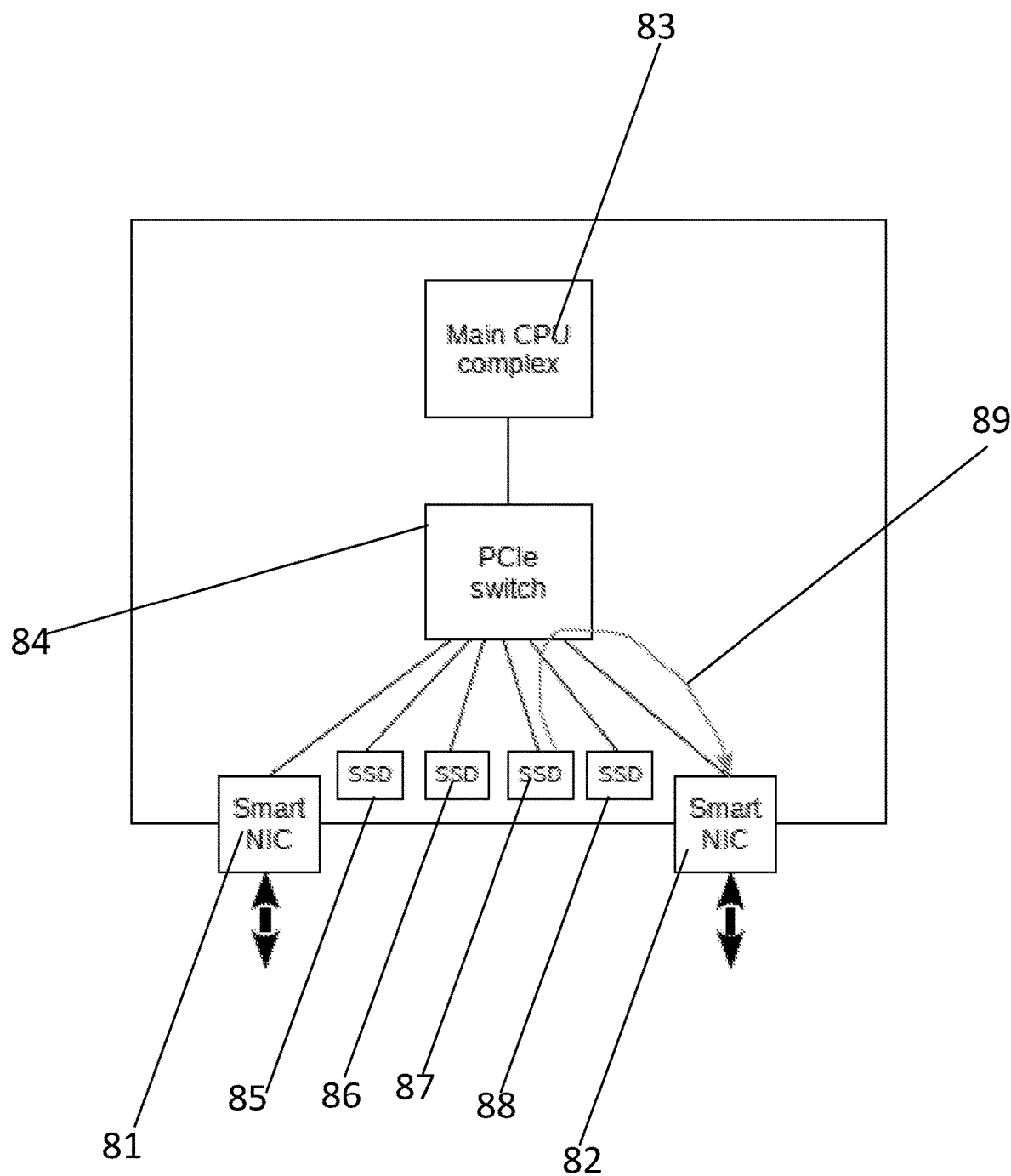
FIG. 8 is a block diagram showing a data flow in a typical hyperconverged system with smart NICs.

For example, FIG. 8 shows a data path for a READ request received from a remote server I a system including a main CPU complex 83, PCIe switch 84, smart NICs 81, 82, and local storage devices 85, 86, 87, 88:
A smart NIC 82 requests a corresponding storage device to perform a READ operation into a local memory 87 available on the PCIe bus (also called "controller memory buffer" or CMB); and Then performs a network RDMA operation directly from this memory to the memory of the remote server (see the line labelled 89).

Embodiments use a similar I/O path but add independent resets and re-initializations in each zone with the ability to manage them.

Figure 9:
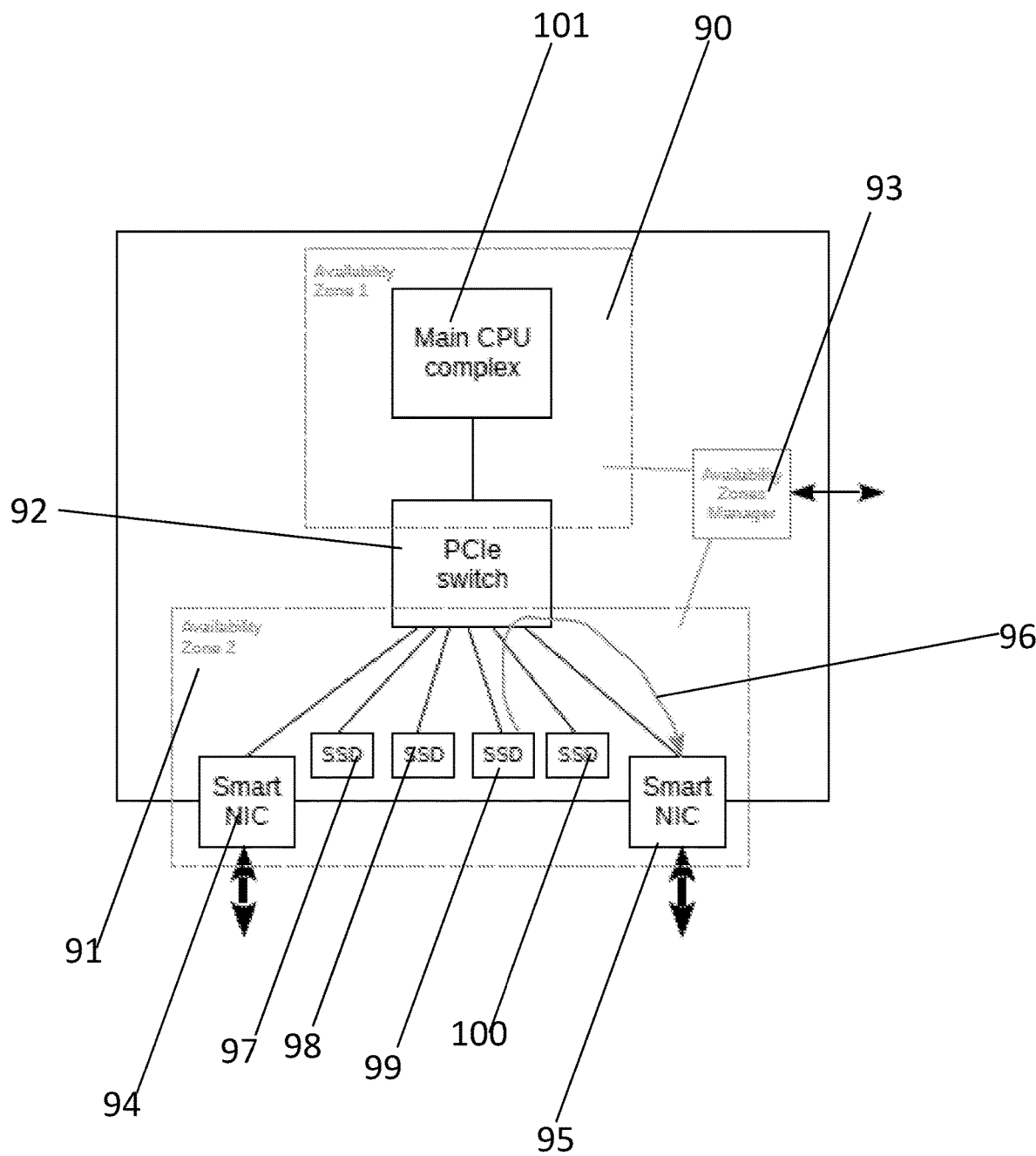
FIG. 9 is a block diagram showing a data flow in a ultraconverged system with smart NICs, two availability zones, and a manager of availability zones.

In FIG. 9, a system arranged as two availability zones 90, 91 respectively including a main CPU complex 101, smart NICs 94, 95, and local storage devices 97, 98, 99, 100, as well as a PCIe switch 92, is managed by a manager of availability zones 93, as described above. A smart NIC 95 requests a corresponding storage device to perform a READ operation into a local memory 99 available on the PCIe bus and then performs a network RDMA operation directly from this memory to the memory of the remote server (see the line labelled 96).

Computer System

Figure 10:
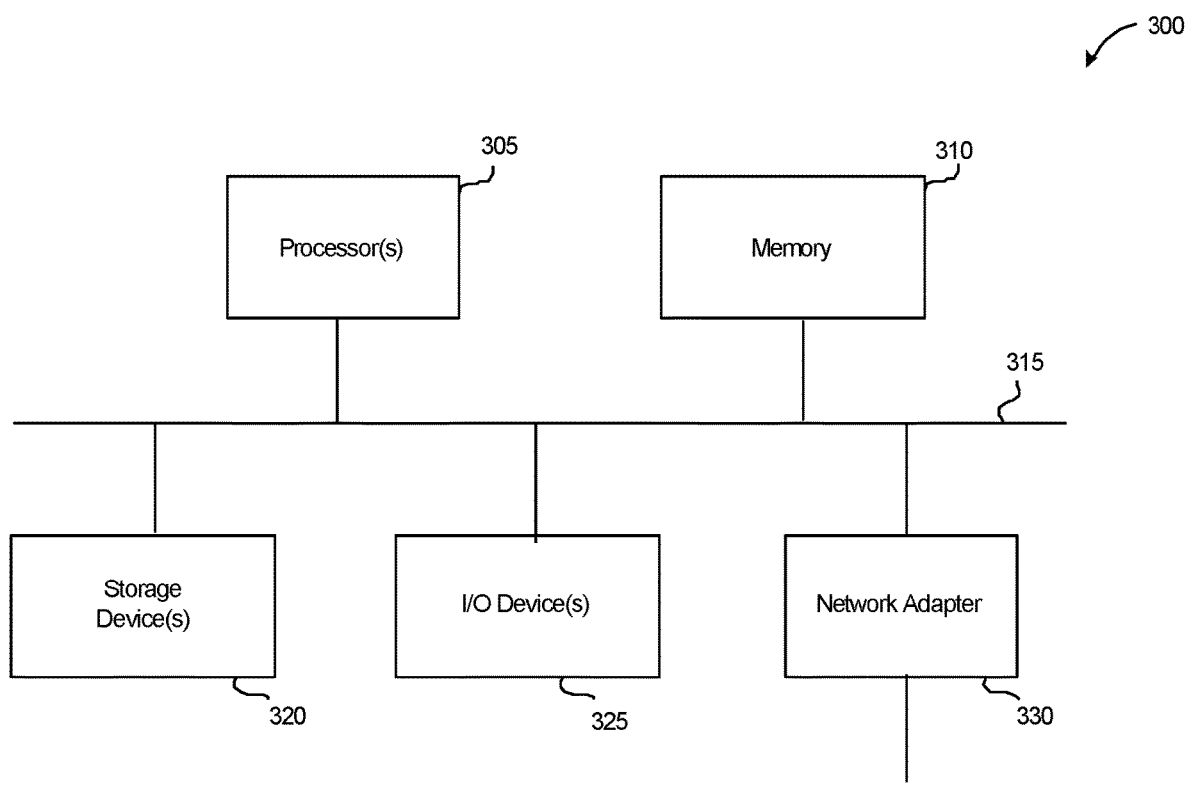
FIG. 10 shows a diagrammatic representation of a machine in the example form of a computer system within

FIG. 10 is a block diagram of a computer system as may be used to implement certain features of some of the embodiments.

The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325, e.g., keyboard and pointing devices, touch devices, display devices, storage devices 320, e.g., disk drives, and network adapters 330, e.g., network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a universal serial bus (USB), IIC (I2C) bus, an Institute of Electrical and Electronics Engineers (IEEE) standard 1394 bus, also called Firewire, and Gen-Z, CCIX and OpenCAPI.

The memory 310 and storage devices 320 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media, e.g., non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g., via network adapter 330.

The various embodiments introduced herein can be implemented by, for example, programmable circuitry, e.g., one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, GPU or other accelerator devices, etc.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. A single server, comprising:
a plurality of availability zones within the single server, wherein the single server is split into said plurality of availability zones, the single server including each of storage and compute components, wherein at least one of each of the storage and compute components is associated with a different availability zone than each of the other of the storage and compute components, wherein the plurality of availability zones are hardware defined; and
wherein resetting and/or disconnecting any component of either of the compute or storage components in any availability zone from power and replacing said component does not affect availability of any other component in any other availability zone.

2. The single server of claim 1, further comprising:
a manager of availability zones for independently, locally, and/or remotely controlling functionality in each of said availability zones.

3. The single server of claim 2, wherein said manager of availability zones generates a requested reset type in a requested availability zone.

4. The single server of claim 2, wherein said manager of availability zones generates reset signals or requests for any or all components located in any of said plurality of availability zones.

5. The single server of claim 1, wherein said resetting comprises a reset type comprising any of a cold (physical), warm (programmatic), or function level reset.

6. The single server of claim 2, wherein said resetting comprises a signal or request that is generated in response to an external request to the manager of availability zones;
wherein the signal or request specifies any of a reset type, an availability zone, and a list of components to be reset.

7. The single server of claim 2, wherein said manager of availability zones discovers and enumerates components in each availability zone.

8. The single server of claim 7, wherein a list of components is requested by an external caller.

9. A single server, comprising:
a plurality of availability zones within the single server, wherein the single server is split into said plurality of availability zones, the single server including each of storage and compute components, wherein at least one of each of the storage and compute components is associated with a different availability zone than each of the other of the storage and compute components, wherein the plurality of availability zones are hardware defined; and
a manager of availability zones, said manager of availability zones independently managing any of connectivity and reset functionality for one or more of said availability zones, wherein resetting and/or disconnecting any component of either of the compute components or the storage components in any availability zone from power and replacing said component does not affect availability of any component in any other availability zone.

10. The single server of claim 9, wherein said manager of availability zones locally and/or remotely controls reset functionality in each zone; and
wherein said manager of availability zones generates a requested reset type in a requested availability zone.

11. The single server of claim 9, further comprising:
a PCI Express (PCIe) domain, wherein said availability zones are interconnected via one or more PCIe switches; and
wherein each availability zone is configured to receive a reset from said manager of availability zones implemented as a separate PERST # signal.

12. The single server of claim 9, wherein each availability zone comprises in-band and out of band management.

13. The single server of claim 11, wherein said one or more PCIe switches are partitioned into two or more partitions, with one or more PCIe partitions per availability zone;
wherein each partition has its own dedicated PERST # lane that is connected to all PCIe components in the partition and disconnected from a corresponding (PERST #) switch pin;
wherein said PERST # lane is connected to said manager of availability zones by which the manager of availability zones resets the partition; and
wherein a global per-switch PERST # pin is connected to the manager of availability zones to reset the PCIe switch via the manager of availability zones.

14. The single server of claim 11, further comprising:
one or more PCIe Non-Transparent Bridges (NTB) for performing disconnect between availability zones or components in availability zones; and
wherein reset signals incoming to PCIe switch are physically disconnected from all sources, except for the manager of availability zones.

15. The single server of claim 11, wherein, for a logical disconnect, said PCIe switch is internally programmed to ignore reset (PERST #) pins.

16. The single server of claim 11, wherein all reset requests for a particular availability zone are generated by the manager of availability zones and are not propagated across other availability zones.

17. The single server of claim 11, wherein said manager of availability zones enumerates availability zones in said single server and attributes of said availability zones, including available PCIe end points in each zone and their attributes; and
wherein said manager of availability zones requests reset of an entire availability zone or any specific PCIe end point or function in the availability zone.

18. The single server of claim 9, wherein said a manager of availability zones is implemented as part of a PCIe switch.

19. The single server of claim 9, wherein a requestor sends a request to said single server to enumerate components and availability zones;
wherein said manager of availability zones composes a list of one or more components and availability zones; and
wherein said manager of availability zones forwards said list to said requestor.

20. The single server of claim 9, wherein a requestor sends a request to said single server to return a first component and continues to send requests to said single server return any additional components until no more components available.

21. The single server of claim 9, wherein a requestor composes a request to reset a given list of components in a target availability zone;
wherein said requestor forwards the request to the manager of availability zones;
wherein said manager of availability zones issues reset signals or sequences to target components in the target availability zone; and
wherein said manager of availability zones, as appropriate and upon completion of all reset processes, acknowledges completion of the reset request to the requestor.

22. The single server of claim 9, further including:
a main OS configured within a main OS availability zone;
wherein, in a main OS reboot sequence, a BIOS triggers a PERST # signal to perform re-initialization of end points attached to a PCIe bus, wherein only end points in the main OS availability zone receive said signal;
wherein said end points attached to said PCIe bus perform local re-initialization comprising a set of internal component specific steps necessary to bring said main OS at first to a state equivalent to that after a power-on state, then to a full functioning state, wherein smart NICs and storage devices located in other availability zones do not receive this signal and continue serving local storage to remote servers without interruption;
wherein said main OS boots up and reconnects to local storage services provided by a smart NIC; and
wherein when a main OS driver detects that a smart NIC or a local storage device become unresponsive, the main OS driver resets such unresponsive component via a new reset interface through the manager of availability zones.

23. The single server of claim 9, said single server further comprising:
a generic internal server fabric that is split into multiple availability zones, where a main CPU complex forms one availability zone, while one or more smart NICs and attached storage devices form one or more additional availability zones, wherein said availability zones are connected via one or more fabric interconnects.

24. The single server of claim 23, wherein said fabric interconnects are either physically disconnected from each availability zone's reset signals or requests or said fabric interconnects are logically disconnected from each availability zone's reset signals or requests, wherein said signals or requests do not affect any components outside of the availability zone, including the interconnect itself.

25. A server comprising a plurality of availability zones within the server, wherein the server is split into said plurality of availability zones, wherein the plurality of availability zones are hardware defined, said server comprising:
compute components arranged in a first availability zone;
storage components arranged in a second availability zone;
a manager of availability zones, said manager of availability zones independently controlling reset functionality in each zone of said plurality of availability zones including the first availability zone and the second availability zone, locally and/or remotely, to generate a requested reset type in a requested availability zone;
wherein resetting and/or disconnecting any component of either of the compute or storage components in any availability zone from power and replacing said component does not affect availability of any other component in any other availability zone.

26. The server of claim 25, further comprising:
a plurality of managers of availability zones.

27. The server of claim 25, said manager of availability zones comprising a local and/or remote programming interface that:
enumerates availability zones in said server and their attributes, including any of available fabric end points in each availability zone and end point attributes; and
requests reset of an entire availability zone or any specific fabric end point or function in an availability zone.

28. The server of claim 25, further comprising:
a smart NIC configured to request a corresponding storage device to perform a READ operation into a local memory available on a PCIe bus, wherein said smart NIC subsequently performs a network RDMA operation directly from said local memory to a memory of a remote server; and
wherein said smart NIC and local memory reside within an availability zone within said server, with regard to all other availability zones within said server, that is independently reset and re-initialized by said manager of availability zones.

29. A method, comprising:
dividing a single server into a plurality of availability zones; wherein the single server is split into said plurality of availability zones, wherein the plurality of availability zones are hardware defined, the single server including each of storage and compute components, wherein at least one of each of the storage and compute components is associated with a different availability zone than each of the other of the storage and compute components;
resetting and/or disconnecting any component of either of the compute components or the storage components in any availability zone from power and replacing said component without affecting availability of any other component in any other availability zone.

30. The method of claim 29, further comprising:
locally and/or remotely independently controlling functionality in each of said availability zones with a manager of availability zones.

31. The method of claim 30, further comprising:
said manager of availability zones generating a requested reset type in a requested availability zone.

32. The method of claim 30, further comprising:
said manager of availability zones generating reset signals or requests for any or all components located in any of said plurality of availability zones.

33. The method of claim 29, wherein said resetting comprises a reset type comprising any of a cold (physical), warm (programmatic), or function level reset.

34. The method of claim 31, further comprising:
generating said reset comprises a signal or request in response to an external request to the manager of availability zones;
wherein the signal or request specifies any of a reset type, an availability zone, and a list of components to be reset.

35. The method of claim 30, further comprising:
said manager of availability zones discovering and enumerating components in each availability zone.

36. The method of claim 35, further comprising:
an external caller requesting a list of components.

37. A method, comprising:
providing a server comprising a plurality of availability zones within said single server, wherein the single server is split into said plurality of availability zones, wherein the plurality of availability zones are hardware defined;
including each of storage and compute components in the single server, wherein at least one of each of the storage and compute components is associated with a different availability zones than each of the other of the storage and compute components; and
independently managing any of connectivity and reset functionality for each of said availability zones with manager of availability zones.

38. The method of claim 37, further comprising:
locally and/or remotely controlling reset functionality in each zone with said manager of availability zones; and
generating a requested reset type in a requested availability zone with said manager of availability zones.

39. The method of claim 37, further comprising:
providing a PCI Express (PCIe) domain;
interconnecting said availability zones via one or more PCIe switches; and configuring each availability zone to receive a reset implemented as a separate PERST # signal from said manager of availability zones.

40. The method of claim 37, wherein each availability zone comprises in-band and out of band management.

41. The method of claim 39, further comprising:
partitioning said one more PCIe switches into two or more partitions, with one PCIe partition per availability zone;
providing each partition with its own dedicated PERST # lane that is connected to all PCIe components in the partition and disconnected from a corresponding (PERST #) switch pin;
connecting said PERST # lane to said manager of availability zones by which the manager of availability zones resets the partition; and
connecting a global per-switch PERST # pin to the manager of availability zones to reset the PCIe switch via the manager of availability zones.

42. The method of claim 39, further comprising:
performing a physical disconnect with one or more PCIe Non-Transparent Bridges (NTB) and
physically disconnecting reset signals incoming to PCIe switch from all sources, except for the manager of availability zones.

43. The method of claim 39, further comprising:
for a logical disconnect, internally programming said PCIe switch to ignore reset (PERST #) pins.

44. The method of claim 37, further comprising:
the manager of availability zones generating all reset requests for a particular availability zone, wherein said reset requests are not propagated across other availability zones.

45. The method of claim 37, further comprising:
said manager of availability zones enumerating availability zones in said single server and attributes of said availability zones, including available PCIe end points in each zone and their attributes; and
said manager of availability zones requesting reset of an entire availability zone or any specific PCIe end point or function in the availability zone.

46. The method of claim 37, further comprising:
implementing said a manager of availability zones as part of a PCIe switch.

47. The method of claim 37, further comprising: a requestor sending a request to said single server to enumerate components and availability zones;

said manager of availability zones composing a list of one or more components and availability zones; and said manager of availability zones forwarding said list to said requestor.

48. The method of claim 37, wherein a requestor sends a request to said single server to return a first component and continues to send requests to said single server return any additional components until no more components available.

49. The method of claim 37, further comprising:
a requestor composing a request to reset a given list of components in a target availability zone;
said requestor forwarding the request to the manager of availability zones;
said manager of availability zones issuing reset signals or sequences to target components in the target availability zone;
said manager of availability zones awaiting completion of all reset processes and sequences; and
said manager of availability zones acknowledging completion of the reset request to the requestor.

50. The method of claim 37, further comprising:
in a main OS reboot sequence, a BIOS triggering a PERST # signal to perform re-initialization of end points attached to a PCIe bus, wherein only end points in a main OS availability zone receive said signal;
said end points attached to said PCIe bus performing local re-initialization comprising a set of internal component specific steps necessary to bring said main OS at first to a state equivalent to that after a power-on state, then to a full functioning state, wherein smart NICs and storage devices located in other availability zones do not receive this signal and continue serving local storage to remote servers without interruption;
said main OS booting up and reconnecting to local storage services provided by a smart NIC; and
when a main OS driver detects that a smart NIC or a local storage device become unresponsive, the main OS driver resetting such unresponsive component via a new reset interface through the manager of availability zones.

51. The method of claim 37, said single server further comprising:
splitting a generic internal server fabric into multiple availability zones, where a main CPU complex forms one availability zone, while one or more smart NICs and attached storage devices form one or more additional availability zones, wherein said availability zones are connected via one or more fabric interconnects.

52. The method of claim 51, further comprising:
either physically disconnecting said fabric interconnects from each availability zone's reset signals or requests, or logically disconnecting said fabric interconnects from each availability zone's reset signals or requests, wherein said signals or requests do not affect any components outside of the availability zone, including the interconnect itself.

53. In a server having a plurality of availability zones within said server that are hardware defined, wherein the server is split into said plurality of availability zones and the server including at least one of each of storage and compute components arranged in different availability zones, a method comprising:
independently controlling reset functionality in each zone of said plurality of availability zones, locally and/or remotely with a manager of availability zones to generate a requested reset type in a requested availability zone.

54. The method of claim 53, further comprising:
providing a plurality of managers of availability zones.

55. The method of claim 53, further comprising:
for said manager of availability zones, providing a local and/or remote programming interface that:
enumerates availability zones in said server and their attributes, including any of available fabric end points in each availability zone and end point attributes; and
requests reset of an entire availability zone or any specific fabric end point or function in an availability zone.

56. The method of claim 53, further comprising:
performing a READ operation with a smart NIC into a local memory available on a PCIe bus; and
said smart NIC subsequently performing a network RDMA operation directly from said local memory to a memory of a remote server;
wherein said smart NIC and local memory reside within an availability zone within said server, with regard to all other availability zones within said server, that is independently reset and re-initialized by said manager of availability zones.

* * * * *